(12) United States Patent
Kanenari

(10) Patent No.: US 11,518,201 B2
(45) Date of Patent: Dec. 6, 2022

(54) TIRE INFORMATION ACQUISITION DEVICE

(71) Applicant: The Yokohama Rubber Co., LTD., Tokyo (JP)

(72) Inventor: Daisuke Kanenari, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 235 days.

(21) Appl. No.: 16/963,199

(22) PCT Filed: Dec. 20, 2018

(86) PCT No.: PCT/JP2018/047082
§ 371 (c)(1),
(2) Date: Jul. 17, 2020

(87) PCT Pub. No.: WO2019/142594
PCT Pub. Date: Jul. 25, 2019

(65) Prior Publication Data
US 2021/0122196 A1    Apr. 29, 2021

(30) Foreign Application Priority Data

Jan. 18, 2018    (JP) .............................. JP2018-006311

(51) Int. Cl.
*B60C 23/04*    (2006.01)
*B60C 19/00*    (2006.01)

(52) U.S. Cl.
CPC ............ *B60C 23/041* (2013.01); *B60C 19/00* (2013.01); *B60C 23/0493* (2013.01); *B60C 23/0498* (2013.01); *B60C 2019/004* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 8,742,912 B2* 6/2014 Blanchard ........... B60C 23/0491
340/447
9,954,401 B2* 4/2018 Yang ..................... B60C 23/041
(Continued)

FOREIGN PATENT DOCUMENTS

DE        102 17 215         4/2005
DE    10 2008 054 161       5/2010
(Continued)

OTHER PUBLICATIONS

International Search Report for International Application No. PCT/JP2018/047082 dated Feb. 12, 2019, 4 pages, Japan.

*Primary Examiner* — Andre J Allen
(74) *Attorney, Agent, or Firm* — Thorpe North & Western

(57) ABSTRACT

A tire information acquisition device includes: a sensor unit mountable on a tire inner surface and including a sensor configured to acquire tire information; and a power supply unit mountable on a wheel. The power supply unit includes a power supply mechanism configured to supply power to the sensor unit in a non-contact manner. The sensor unit includes: a power reception mechanism configured to receive power from the power supply unit in a non-contact manner; and an information transmission unit configured to wirelessly transmit acquired tire information.

14 Claims, 3 Drawing Sheets

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22

USPC .................................................. 73/146–146.8

See application file for complete search history.

(56) References Cited

U.S. PATENT DOCUMENTS

| | | | |
|---|---|---|---|
| 2002/0174925 | A1 | 11/2002 | Wilson et al. |
| 2003/0209064 | A1 | 11/2003 | Adamson et al. |
| 2004/0211250 | A1 | 10/2004 | Adamson et al. |
| 2006/0158340 | A1 | 7/2006 | Wilson et al. |
| 2009/0080138 | A1 | 3/2009 | Lohndorf et al. |
| 2011/0001493 | A1 | 1/2011 | Lohndorf et al. |
| 2011/0248846 | A1* | 10/2011 | Belov ............... G01N 33/0075 340/539.1 |
| 2012/0000277 | A1 | 1/2012 | Fischer |
| 2012/0049620 | A1* | 3/2012 | Jansen ................ B60C 23/041 307/104 |
| 2013/0236038 | A1* | 9/2013 | Paget .................... H04R 17/00 381/190 |
| 2015/0280616 | A1 | 10/2015 | Naito |
| 2016/0016445 | A1 | 1/2016 | Peine |
| 2016/0329749 | A1 | 11/2016 | Yang |
| 2017/0144496 | A1* | 5/2017 | Dudar ................ B60C 23/0427 |
| 2017/0197481 | A1 | 7/2017 | Peine |
| 2018/0208002 | A1 | 7/2018 | Peine |
| 2020/0346501 | A1 | 11/2020 | Peine |
| 2021/0115969 | A1* | 4/2021 | Hubert .................. H02J 50/70 |

FOREIGN PATENT DOCUMENTS

| | | |
|---|---|---|
| DE | 20 2014 002 971 | 6/2014 |
| DE | 10 2014 110 184 | 1/2016 |
| DE | 10 2016 222 535 | 5/2018 |
| JP | 2005-525265 | 8/2005 |
| JP | 2005-532551 | 10/2005 |
| JP | 2005-335692 | 12/2005 |
| JP | 2006-027390 | 2/2006 |
| JP | 2007-300758 | 11/2007 |
| JP | 2009-260684 | 11/2009 |
| JP | 2015-152323 | 8/2015 |
| JP | 2016-135044 | 7/2016 |
| WO | WO 03/095244 | 11/2003 |
| WO | WO 03/095245 | 11/2003 |
| WO | WO 2004/005054 | 1/2004 |
| WO | WO 2010/049134 | 5/2010 |
| WO | WO 2014/185080 | 11/2014 |

\* cited by examiner

TIRE INFORMATION ACQUISITION DEVICE

TECHNICAL FIELD

The present technology relates to a tire information acquisition device, and particularly relates to a tire information acquisition device that can provide the weight of a sensor unit reduced as much as possible and that can also provide the suppressed effect on the weight balance of a tire.

BACKGROUND ART

To acquire tire internal information such as internal pressure or temperature, various sensors are installed in a tire cavity. In such sensors, abundant power supplies are required to continually acquire advanced tire information.

In a case where a battery is used as a power supply, there is a problem of being unable to continuously supply power for a long period of time. In addition, in a case where energy harvesting technology that generates power by using rotation energy of a tire is used as a power supply, a device having relatively large size and weight is required to increase power generation efficiency. Thus, when such a device is installed in a tire, there is a problem of the significant effect on the weight balance of the tire. Further, in a case where to supply power to a sensor, a power supply device is installed in a tire inner surface (for example, see Japan Unexamined Patent Publication Nos. 2005-525265 and 2005-335692), there is a problem of the effect on the weight balance of a tire, and thus deterioration of uniformity.

SUMMARY

The present technology provides a tire information acquisition device that can provide the weight of a sensor unit reduced as much as possible and that can also provide the suppressed effect on the weight balance of a tire.

A tire information acquisition device for achieving the above-described object includes: a sensor unit mountable on a tire inner surface and including a sensor configured to acquire tire information; and a power supply unit mountable on a wheel. The power supply unit includes a power supply mechanism configured to supply power to the sensor unit in a non-contact manner. The sensor unit includes: a power reception mechanism configured to receive power from the power supply unit in a non-contact manner; and an information transmission unit configured to wirelessly transmit acquired tire information.

According to an embodiment of the present technology, the sensor unit mountable on the tire inner surface and including the sensor configured to acquire tire information, and the power supply unit mountable on the wheel are provided. The power supply unit includes the power supply mechanism configured to supply power to the sensor unit in a non-contact manner. The sensor unit includes: the power reception mechanism configured to receive power from the power supply unit in a non-contact manner; and the information transmission unit configured to wirelessly transmit acquired tire information. Thus, the power supply unit is configured separately from the sensor unit. Thus, the weight of the sensor unit can be reduced as much as possible. In addition, since the power supply unit having a large weight is disposed in a wheel without being disposed in the tire inner surface, the effect on the weight balance of a tire can be suppressed.

According to an embodiment of the present technology, the power supply unit preferably includes, as the power supply mechanism, a power generation unit configured to generate electrical energy by rotation or vibration of a tire during traveling, an electrical storage unit configured to store electrical energy generated by the power generation unit, and a power transmission unit configured to transmit electrical energy stored in the electrical storage unit to the outside. Accordingly, the power supply unit can efficiently supply power by using rotation or vibration of a tire during traveling.

According to an embodiment of the present technology, the power generation unit preferably includes an electret configured to generate power by a positional change of an electrode made by rotational movement or reciprocating movement. Accordingly, the power generation unit can efficiently generate power by a power generation system including the electret.

According to an embodiment of the present technology, the sensor unit preferably includes, as the power reception mechanism, an antenna configured to receive power supplied from the power supply unit. Preferably, the antenna is radially disposed in a surface of an innerliner layer constituting the tire inner surface and receives power in a non-contact manner by radio waves, electromagnetic induction, or magnetic resonance. Accordingly, the durability of the antenna constituting the sensor unit can be improved.

According to an embodiment of the present technology, the sensor unit is preferably driven directly by power supplied from the power supply unit. Accordingly, the sensor unit can be driven efficiently.

According to an embodiment of the present technology, the sensor unit is preferably bonded by vulcanization to an innerliner layer constituting the tire inner surface. The sensor unit is subjected to a vulcanization process together with a tire component and thus can be installed efficiently in the tire inner surface.

According to an embodiment of the present technology, the power supply unit preferably includes an information reception unit configured to receive tire information transmitted from the sensor unit, and an information retransmission unit configured to retransmit the received tire information.

Accordingly, when the power supply unit receives the tire information transmitted from the sensor unit and retransmits the tire information, the power supply unit can amplify transmission output, and this leads to a reduction in the required power of the sensor unit.

According to an embodiment of the present technology, the sensor unit is preferably disposed in the tire inner surface in the range from −90° to 90° with respect to a tire circumferential direction from a position of the power supply unit in the tire circumferential direction. Accordingly, the power supply unit and the sensor unit are disposed close to each other, and thus power supply efficiency can be improved.

According to an embodiment of the present technology, the power supply unit is preferably installed in a valve of the wheel. Accordingly, the power supply unit can be installed very easily. In particular, in a case where an air pressure measurement function is added to the power supply unit, the weight of the sensor unit can be reduced, and thus this leads to further weight reduction.

DETAILED DESCRIPTION

Figure 1:
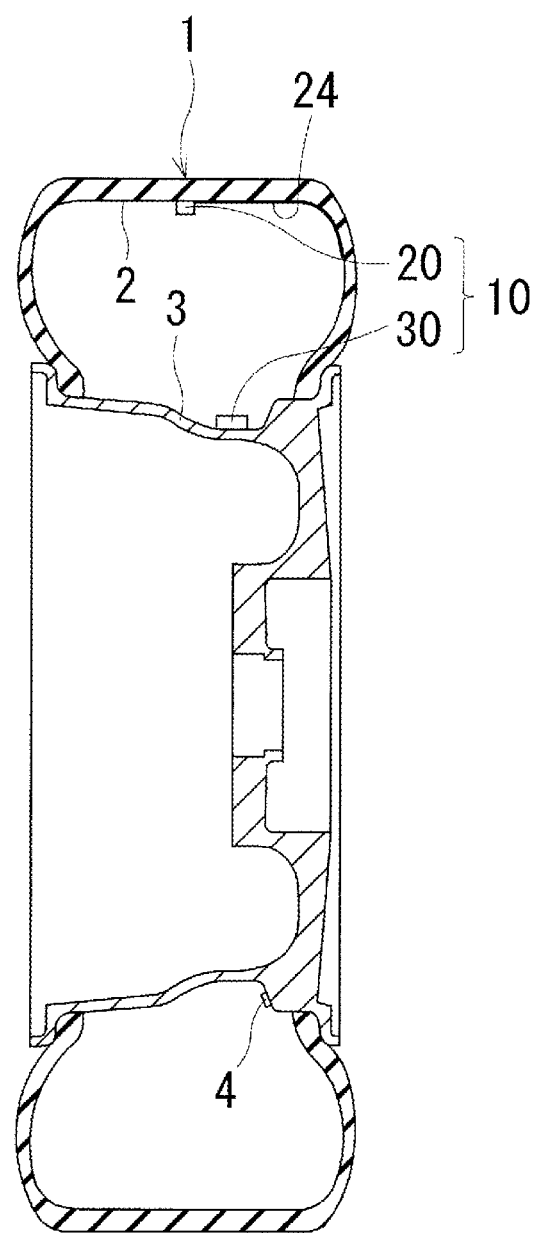
FIG. 1 is a cross-sectional view illustrating a pneumatic tire in which a tire information acquisition device according to an embodiment of the present technology is mounted.
Figure 2:
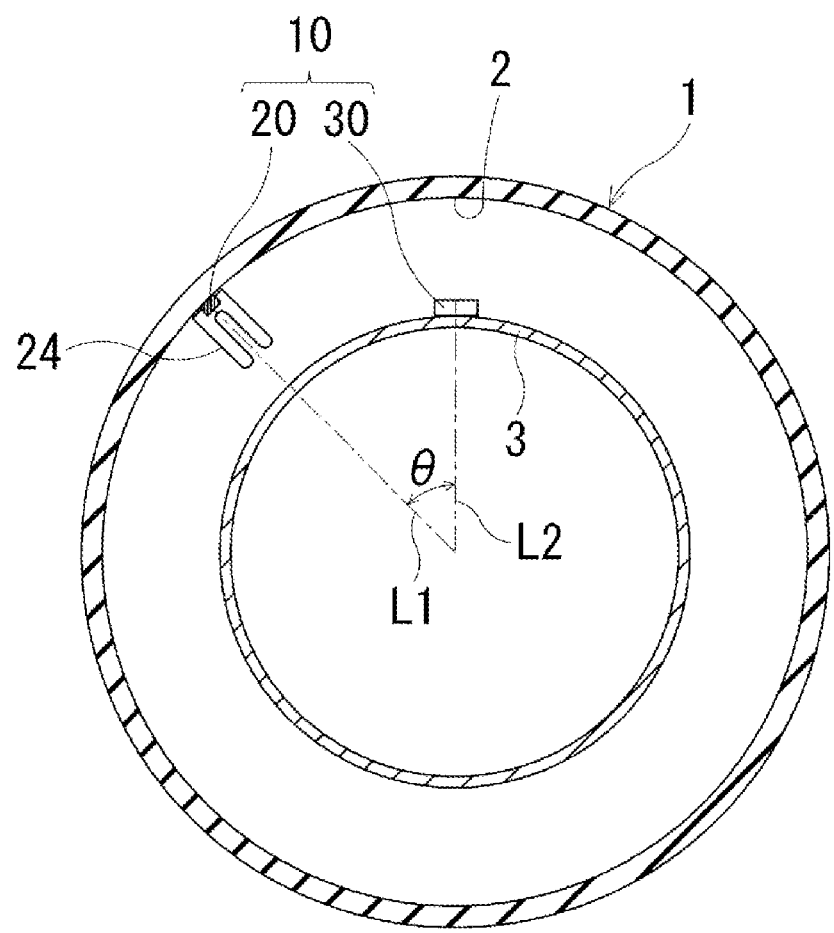
FIG. 2 is a cross-sectional view taken along an equatorial plane and illustrating a pneumatic tire in which a tire information acquisition device according to an embodiment of the present technology is mounted.
Figure 3:
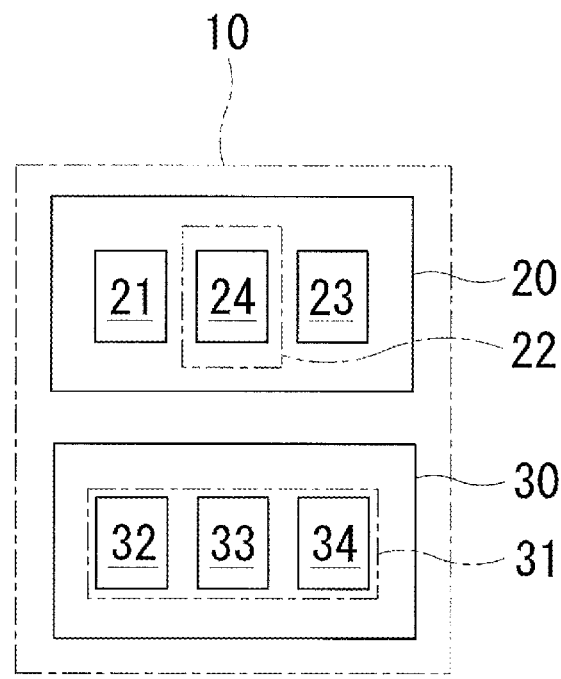
FIG. 3 is a schematic view illustrating a configuration of a tire information acquisition device according to an embodiment of the present technology.

Configurations of embodiments of the present technology will be described in detail below with reference to the accompanying drawings. FIGS. 1 and 2 illustrate a pneumatic tire in which a tire information acquisition device according to an embodiment of the present technology is mounted. FIG. 3 illustrates a configuration of a tire information acquisition device according to an embodiment of the present technology.

As illustrated in FIGS. 1 and 2, a tire cavity is formed between a pneumatic tire 1 and a wheel 3, and a tire information acquisition device 10 is mounted in the tire cavity. The tire information acquisition device 10 includes a sensor unit 20 mountable on a tire inner surface 2 and a power supply unit 30 mountable on the wheel 3. The tire inner surface 2 includes an innerliner layer that is a tire component. A cylindrical valve 4 configured to inject pressure from the outside to the inside of the tire is provided in the wheel 3.

In FIG. 1, the sensor unit 20 is provided at a position corresponding to the center of a tread portion of the pneumatic tire 1 in the tire lateral direction. As illustrated in FIG. 3, the sensor unit 20 includes a sensor 21, a power reception mechanism 22, and an information transmission unit 23. The sensor 21 is a sensor configured to measure tire information such as an internal temperature or internal pressure of the pneumatic tire 1, and the amount of wear of the tread portion. The power reception mechanism 22 receives power from the power supply unit 30 in a non-contact manner. An example of a non-contact power reception system includes radio waves, electromagnetic induction, or magnetic resonance. The information transmission unit 23 wirelessly transmits various kinds of tire information acquired by the sensor 21 to the outside of the tire or to the power supply unit 30.

In addition, the sensor unit 20 includes an antenna 24 as the power reception mechanism 22, and the antenna 24 receives power supplied from the power supply unit 30. The antenna 24 is radially disposed in the tire inner surface 2 (a surface of the innerliner layer). Such an antenna 24 preferably receives power in a non-contact manner by radio waves, electromagnetic induction, or magnetic resonance.

The power supply unit 30 includes a power supply mechanism 31 configured to supply power to the sensor unit 20 in a non-contact manner. An example of a non-contact power supply system includes radio waves, electromagnetic induction, or magnetic resonance. The power supply unit 30 is preferably disposed, in particular, in a well that is a flat portion of a rim of the wheel 3.

In addition, the power supply unit 30 includes, as the power supply mechanism 31, a power generation unit 32 configured to generate electrical energy by rotation or vibration of the pneumatic tire 1 during traveling, an electrical storage unit 33 configured to store electrical energy generated by the power generation unit 32, and a power transmission unit 34 configured to transmit electrical energy stored in the electrical storage unit 33 to the outside. In particular, the power generation unit 32 preferably includes a structure that generates electrical energy by rotation of the pneumatic tire 1.

The tire information acquisition device described above includes: the sensor unit 20 mountable on the tire inner surface 2 and including the sensor 21 configured to acquire tire information; and the power supply unit 30 mountable on the wheel 3. The power supply unit 30 includes the power supply mechanism 31 configured to supply power to the sensor unit 20 in a non-contact manner, and the sensor unit 20 includes: the power reception mechanism 22 configured to receive power from the power supply unit 30 in a non-contact manner; and the information transmission unit 23 configured to wirelessly transmit acquired tire information. Thus, the power supply unit 30 is configured separately from the sensor unit 20. Thus, the weight of the sensor unit 20 can be reduced as much as possible. In addition, since the power supply unit 30 having a large weight is disposed in the wheel 3 without being disposed in the tire inner surface 2, the effect on the weight balance of the pneumatic tire 1 can be suppressed.

Figure 4:
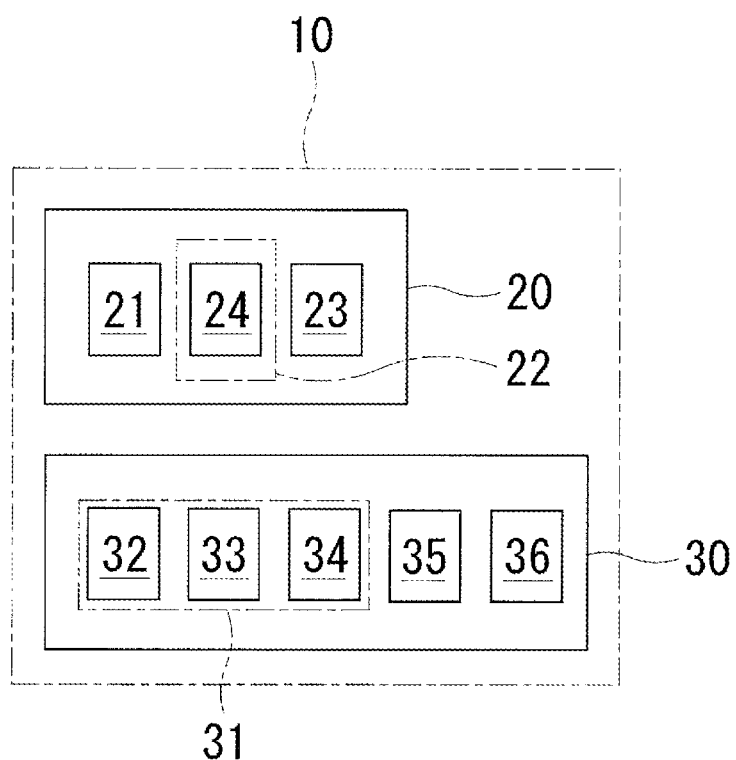
FIG. 4 is a schematic view illustrating a modified example of a configuration of a tire information acquisition device according to an embodiment of the present technology.

FIG. 4 illustrates a modified example of a configuration of a tire information acquisition device according to an embodiment of the present technology. In FIG. 4, a power supply unit 30 includes an information reception unit 35 configured to receive tire information transmitted from a sensor unit 20, and an information retransmission unit 36 configured to retransmit the received tire information. That is, a tire information acquisition device 10 illustrated in FIG. 4 includes a configuration in which the information reception unit 35 and the information retransmission unit 36 are added to the tire information acquisition device 10 illustrated in FIG. 3. The power supply unit 30 is configured in this manner. Thus, when the power supply unit 30 receives tire information transmitted from the sensor unit 20 and retransmits the tire information, the power supply unit 30 can amplify transmission output, and this leads to a reduction in the required power of the sensor unit 20.

In the tire information acquisition device described above, the sensor unit 20 may be driven directly by power supplied from the power supply unit 30. That is, the sensor unit 20 is driven by an RF tag system. The sensor unit 20 is directly driven by power supplied from the power supply unit 30 in this manner, and thus the sensor unit 20 can be driven efficiently.

In addition, the sensor unit 20 is preferably bonded by vulcanization to the innerliner layer constituting the tire inner surface 2. Since the sensor unit 20 receives power from the power supply unit 30, the sensor unit 20 itself has no power supply device. Thus, the sensor unit 20 can be subjected to a vulcanization process together with a tire component. Consequently, the sensor unit 20 can be installed efficiently in the tire inner surface 2.

In the tire information acquisition device described above, a power generation unit 32 constituting the power supply unit 30 preferably includes an electret configured to generate power by a positional change of an electrode, made by rotational movement or reciprocating movement, and the power generation unit 32 further preferably generates power by using a positional change of the electrode made by rotational movement. The power generation unit 32 includes the electret in this manner, and thus the power generation unit 32 can efficiently generate power.

In addition, the power supply unit 30 is preferably fixed to a valve 4 of a wheel 3. The power supply unit 30 is installed in this manner, and thus the power supply unit 30 can be installed very easily. In particular, in a case where an air pressure measurement function is added to the power supply unit 30, the weight of the sensor unit 20 can be reduced, and thus this leads to further weight reduction.

In FIG. 2, a position of the sensor unit 20 in the tire circumferential direction in the tire inner surface 2 is defined as a position L1, and a position of the power supply unit 30 in the tire circumferential direction in the wheel 3 is defined as a position L2. In addition, an angle formed between the position L1 of the sensor unit 20 and the position L2 of the power supply unit 30 is defined as an angle θ. In this case, the angle θ is preferably in the range of from −90° to 90°, and more preferably in the range from −45° to 45°. The angle θ is appropriately set in this manner, and thus the power supply unit 30 and the sensor unit 20 are disposed close to each other. Thus, power supply efficiency can be improved. Note that any of the positions L1 and L2 is based on the center position of the sensor unit 20 or the power supply unit 30 in the tire circumferential direction.

In the above-described embodiment of FIG. 2, the example in which the antenna 24 is disposed in a region from the tread portion to a sidewall portion of the pneumatic tire 1 and is formed in a shape repeatedly bent in the sidewall portion is described; however, the shape of the antenna 24 is not limited to this shape. The antenna 24 may be formed in a shape including a radially elongated portion. In a case where the antenna 24 includes a portion elongated in the tire circumferential direction, the antenna 24 may be damaged due to distortion of the pneumatic tire 1. Thus, the antenna 24 includes the radially elongated portion, and thus durability can be enhanced.

In addition, in the embodiments of FIGS. 3 and 4, the example in which the power supply mechanism 31 includes the power generation unit 32 and the electrical storage unit 33 is described; however, the power supply mechanism 31 can include a battery instead of the power generation unit 32 and the electrical storage unit 33. In particular, in a case where the power supply mechanism 31 includes the power generation unit 32 and the electrical storage unit 33, the power supply mechanism 31 can efficiently supply power by using rotation and vibration of the pneumatic tire 1 during traveling.

The invention claimed is:

1. A tire information acquisition device, comprising:
a sensor unit mountable on a tire inner surface and including a sensor configured to acquire tire information; and
a power supply unit mountable on a wheel;
the power supply unit including a power supply mechanism configured to supply power to the sensor unit in a non-contact manner, the power supply unit being installed in a valve of the wheel; and
the sensor unit including: a power reception mechanism configured to receive power from the power supply unit in a non-contact manner; and an information transmission unit configured to wirelessly transmit acquired tire information.

2. The tire information acquisition device according to claim 1, wherein the power supply unit includes, as the power supply mechanism, a power generation unit configured to generate electrical energy by rotation or vibration of a tire during traveling, an electrical storage unit configured to store electrical energy generated by the power generation unit, and a power transmission unit configured to transmit electrical energy stored in the electrical storage unit to the outside.

3. The tire information acquisition device according to claim 2, wherein the power generation unit includes an electret configured to generate power by a positional change of an electrode made by rotational movement or reciprocating movement.

4. The tire information acquisition device according to claim 1, wherein the sensor unit includes, as the power reception mechanism, an antenna configured to receive power supplied from the power supply unit, and the antenna is radially disposed in a surface of an innerliner layer constituting the tire inner surface and receives power in a non-contact manner by radio waves, electromagnetic induction, or magnetic resonance.

5. The tire information acquisition device according to claim 1, wherein the sensor unit is directly driven by power supplied from the power supply unit.

6. The tire information acquisition device according to claim 1, wherein the sensor unit is bonded by vulcanization to an innerliner layer constituting the tire inner surface.

7. The tire information acquisition device according to claim 1, wherein the power supply unit includes an information reception unit configured to receive tire information transmitted from the sensor unit, and an information retransmission unit configured to retransmit the received tire information.

8. The tire information acquisition device according to claim 1, wherein the sensor unit is disposed in the tire inner surface in the range from −90° to 90° with respect to a tire circumferential direction from a position of the power supply unit in the tire circumferential direction.

9. The tire information acquisition device according to claim 3, wherein the sensor unit includes, as the power reception mechanism, an antenna configured to receive power supplied from the power supply unit, and the antenna is radially disposed in a surface of an innerliner layer constituting the tire inner surface and receives power in a non-contact manner by radio waves, electromagnetic induction, or magnetic resonance.

10. The tire information acquisition device according to claim 9, wherein the sensor unit is directly driven by power supplied from the power supply unit.

11. The tire information acquisition device according to claim 10, wherein the sensor unit is bonded by vulcanization to an innerliner layer constituting the tire inner surface.

12. The tire information acquisition device according to claim 11, wherein the power supply unit includes an information reception unit configured to receive tire information transmitted from the sensor unit, and an information retransmission unit configured to retransmit the received tire information.

13. The tire information acquisition device according to claim 12, wherein the sensor unit is disposed in the tire inner surface in the range from −90° to 90° with respect to a tire circumferential direction from a position of the power supply unit in the tire circumferential direction.

14. The tire information acquisition device according to claim 13, wherein the power supply unit is installed in a valve of the wheel.

* * * * *